United States Patent [19]
Smith

[11] 3,760,485
[45] Sept. 25, 1973

[54] THREADED FASTENER FEED DRIVE AND MECHANISM

[76] Inventor: Floyd E. Smith, 5704 Brewster Ln., Erie, Pa. 16505

[22] Filed: May 19, 1972

[21] Appl. No.: 255,138

[52] U.S. Cl. .............................................. 29/212 D
[51] Int. Cl. ............................................. B23q 7/10
[58] Field of Search ...................... 29/212 D, 211 D, 29/208 R, 208 D, 240; 144/32

[56] References Cited
UNITED STATES PATENTS

| | | | |
|---|---|---|---|
| 2,754,860 | 7/1956 | Moore et al. | 144/32 |
| 2,870,805 | 1/1959 | Zakrzewski et al. | 144/32 |
| 2,886,077 | 5/1959 | Rafferty et al. | 144/32 |

Primary Examiner—Thomas H. Eager
Attorney—Jack E. Dominik et al.

[57] ABSTRACT

A threaded fastener feed and drive mechanism is disclosed of the character which is fed by a feeder to a magazine and a nut runner hand moved to position over the work piece. Thereafter the nut runner is pressed downwardly, the action of which is translated through an actuator and housing to a selector, which in turn moves an escapement thereby removing a single threaded fastener from the magazine and positioning the same for actuation by the nut runner. Upon the stalling of the driver motor, or completion of the tightening of the nut, the nut runner is removed and the escapement returns to its original position in open communication with the magazine to receive another nut.

In one embodiment the escapement is a rotated member, rotating approximately 30° to position the nut for engagement by the nut runner. In another embodiment disclosed, the escapement is a sliding block having a nut receiving chamber which is reciprocated by the selector, the selector having a cammed face which moves relative to a cam follower on the actuator.

11 Claims, 5 Drawing Figures

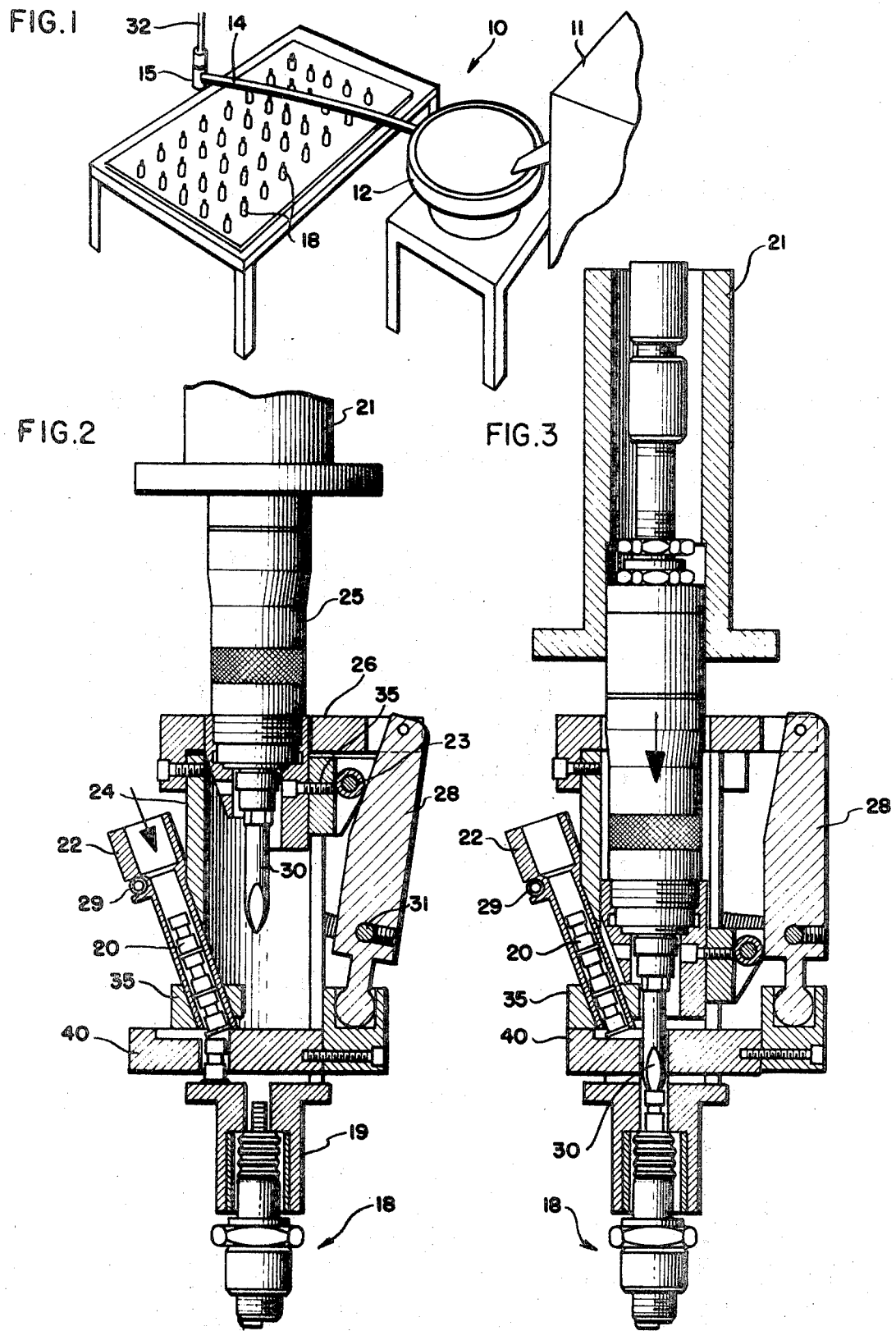

THREADED FASTENER FEED DRIVE AND MECHANISM

BACKGROUND

1. Field of Invention

The field of invention relates primarily to threaded member fasteners. More particularly it relates to that type of threaded member fasteners which is actuated by positioning the tool on the work piece to deliver, orient, and run a nut on a threaded work piece. It will be appreciated that the device can also be used for positioning a slide or jam fitted member which is not rotated. In use, the threaded member fastener illustrative of the present invention is hand held by the operator, and hand positioned on the work piece and thereafter pressed toward the work piece to achieve the positioning and securing of the nut or other fastener.

2. Description of Prior Art

Threaded member fasteners, often referred to as nut runners, and automatic screwdrivers are well known in the field of automating the assembly of parts. Numerous nut runners have been devised, many of which are air driven, in which a cup-like receptacle is provided at the lower portion, and a nut positioned yieldably within the cup. Thereafter the unit is positioned atop the work piece, and pressed to actuate the driving motor thereby running the nut onto the threaded member. Other threaded member fasteners are adaptable to screws as well as nuts, known as the "pick and place" types. In this type of nut runner the nut is fed by a magazine to a particular location in timed relation to the feeding of a work piece. Thereafter the driving member "picks" the nut off the placement and puts the same on the work piece. In most instances, the nut runners of the prior art either require coordination with an automatic jig and assembly fixture, or alternatively require bringing the work piece to the runner.

In the principal commercial prior art, the threaded or other fastening parts are fed into a magazine one at a time. The escapement control is a function of the feeding into the magazine. Thereafter the fastener is driven by air into the driving unit or nut runner, the latter serving the function of actually rotating or driving the fastener into its finalized position. One of the principal drawbacks of such a construction is the possibility of the parts becoming jammed, disoriented, and otherwise fouled in the magazine feed. One of the base principles employed in the present invention is to deliver a full line of parts to the drive mechanism, each one being sequentially pressed against the escapement, and each one being driven one at a time directly from the escapement to the driver as a part of the driving function.

Nut runners may be found in Class 221, subclasses 173, 175, and 229 respectively illustrated by U.S. Pat. Nos. 3,286,881; 3,275,191; and 3,311,262. Also, in Class 144, subclass 32, another form of nut runner is shown as exemplified in U.S. Pat. Nos. 2,754,860; 2,870,805; and 2,886,077. The bulk of the nut runners disclosed and exemplified in the subject patents are for high production runs, and specifically tooled to particular jobs.

A problem exists in many assembly operations where the parts which require having a nut run thereon are shaped for one particular operation, on a batch basis, and cannot be readily moved from such a jig to an in-line assembly fixture. More often than not, such items are involved in limited production runs, and accordingly the extensive tooling required for the pick and place type feeder is not justified economically. Furthermore, feeding a screw does not involve the problems of running a nut since the screw in a sense is self aligning. On the other hand, a nut having a relatively narrow and precisely positioned lead thread must be well oriented with regard to the threaded member or the mating threads or the nut in the work piece can be stripped, and the attachment even if achieved is a jammed attachment and causes the part to be a reject.

SUMMARY

In the present invention, the threaded fastener feed and drive mechanism is primarily developed around a drive member or nut runner which has a nut or part engaging means actuated by pressure on the nut or part engaging means. An escapement is provided in direct communication with a magazine which feeds the nuts or parts oriented end to end sequentially, delivered one at a time to the escapement. A housing is provided which slides along an actuator, the actuator being removably secured to the drive member. The nut escapement is slidably positioned within the housing, in one embodiment being rotated and the other being reciprocated. A selector is provided which is operatively coupled to the housing and the actuator, and which coordinate the operation of the drive member toward the housing to first position the nut in place by moving the escapement, and thereafter align the drive member for engaging the nut in aligned relationship to the work piece which is guided by a work piece adaptor. Thus a full line of parts is delivered to the driver and escape one at a time for fastening as a consequence of the actuation of the driving function.

One of the principal objects of the present invention is to provide a threaded member fastener element which is hand operated and manually positioned to engage a work piece which is automatically fed through a magazine, and by which light pressure will position the nut or part in place under positive feed and control and thereafter drive it to its predetermined position of assembly.

A more specific object of the present invention is to provide a nut runner or threaded member fastener achieving the aforesaid objective which is economical to produce, and easy to disassemble for repair and replacement of parts.

Still another object of the present invention is to provide a nut runner or threaded member fastener achieving the above objects which is adaptable to several nut or part sizes, and does not require any extensive jigging or fixturing to ready for its assembly operation.

A related objective of the present invention is directed to a nut runner assembly which can be readily disassembled in the event of the jamming of a nut to free the same and quickly restore the nut runner to operative condition.

Still another object of the present invention is to provide a nut runner or part feeder of the character referred to above in which the dimensional tolerances are close thereby permitting the same ingress to relatively confined spaces, and yet affording sufficient separation from the operator's hand and the movable parts of the nut runner as well as the work piece to minimize the opportunity for finger pinching and the like.

DESCRIPTION OF ILLUSTRATIVE DRAWINGS

Further objects and advantages of the present invention will become apparent as the following description of two illustrative embodiments proceed, taken in conjunction with the accompanying drawings in which:

FIG. 1 is a perspective partially diagrammatic view illustrating a threaded fastener feed and drive mechanism illustrative of the present invention utilized in securing the nuts to the top of spark plugs.

FIG. 2 is a front partially sectioned view of the nut runner portion of the threaded fastener feed and drive mechanism showing the escapement in the closed position ready to transfer a nut into the threaded position.

FIG. 3 is a view similar to FIG. 2, except showing the nut runner and the driver tool in the position for threading the nut onto the illustrative spark plug.

DESCRIPTION OF PREFERRED EMBODIMENT

Figure 5:
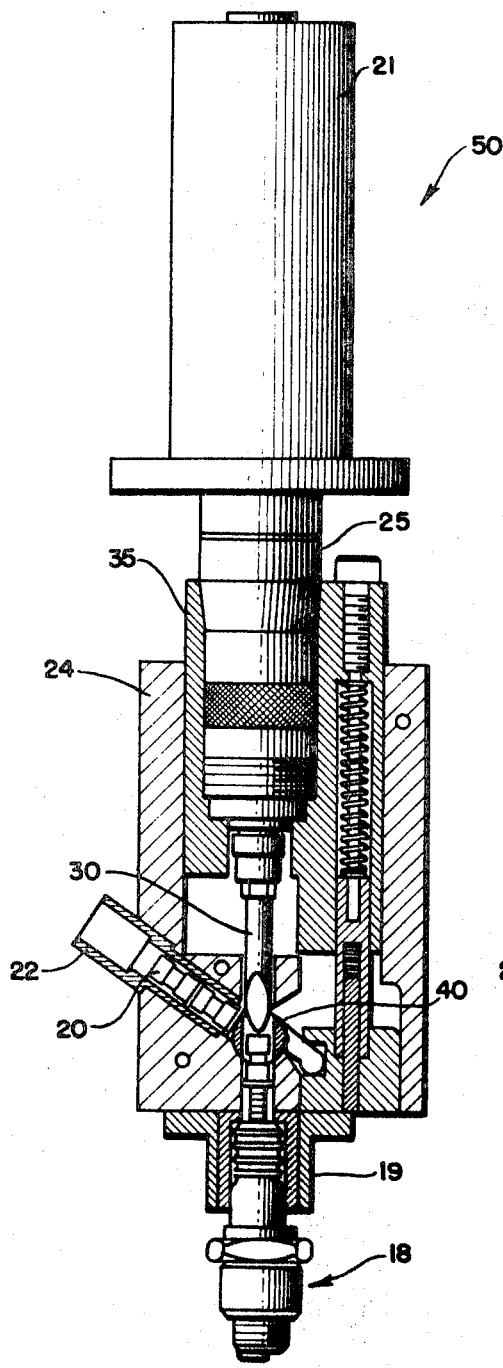
FIG. 5 is a view similar to that shown in FIG. 5 with the escapement in the open position, and the driver tool about to engage the nut to run the same onto the illustrative spark plug.

Prior to describing the specifics of the threaded fastener feed and drive assembly 10 as illustrated in broad outline in FIG. 1, it should be noted that the environment may ideally include a hopper 11, a vibratory bowl feeder 12, a magazine 14, and a nut runner assembly 15. Two embodiments are shown and described of the nut runner assembly 15, that which is shown in FIGS. 2 and 3 being one which utilizes a reciprocatory escapement portion 40, and the alternative embodiment shown in FIGS. 4 and 5 which utilizes a rotary escapement member 40.

At the heart of both the preferred and alternative embodiments is a driver 25, preferably that known as the ARO "Phantom" driver available commercially. In operation, as shown in FIG. 1, the driver 25 of the nut runner 15 is actuated by airline 32, and the operator grasps the handle 21 of the nut runner 15, and depresses the same on top of the spark plug 18. Thereafter, as the operator presses down, the driver 25 moves downwardly within the housing 24, and the driver tool 30 engages a nut 20, and advances the same on to the spark plug 18. The driver 25 is fed by the airline 32, and the magazine 14. Ideally the airline 32 may be suspended from a spring or balancing type cord construction so that with the typical assembly line female employee, the amount of effort required to move the nut runner 15 to each of the various work pieces, illustrated as spark plugs 18 in FIG. 1, is minimized. Fatigue is significantly reduced, and because orientation and feeding of the nuts is automatic as a function of pressing the nut runner 15 down on the work piece as engaged by the nose portion 19, the work may be done on a semi-automatic very high-speed basis.

Referencing now FIG. 2, it will be seen that the housing 24 is secured to the driver 25, a collar 26 being provided at the upper portion thereof for the securing means. A selector cam arm 28 is pinned to the outer portion of the collar 26, and is actuated by means of the cam roller 23 which is an integral part of the actuator 35.

Referring now specifically to FIG. 2, it will be seen that the driver tool 30 is positioned above the nuts 20 to be secured to the spark plug 18. The nuts 20 are conveyed in a feed tube 22 which is positioned approximately at a 30 degree relationship to the axis of rotation of the nut 20 when secured to the spark plug 18. Upon positioning the nose 19, which is adapted to abut the work piece 18, and then depressing the handle 21, the actuator 35 moves downwardly with relation to the housing 24, and the cam roller 23 engages the interior face portion of the selector arm 28, and moves the lower portion of the selector cam arm 28 against the pressure of the spring 29 to shift the escapement 40 with relation to the actuator 35 to thereby transfer one of the nuts into the open space in the nose 19 above the work piece 18. While this shifting motion is taking place, the driver tool 30 is steadily advancing toward the opening at the central portion of the escapement 40, and continues downwardly to engage the upper portion of the threaded nut 20, and thereafter contacts the same and rotates the nut 20 until the same is threaded into position, and the air driven driver 25 stalls. The entire nut runner 15 is then removed from the work piece, and the action of the spring 29 along with the weight of the housing 24 and its contained members return the escapement to the configuration shown in FIG. 2 whereupon another nut drops into position for translation and feeding.

ALTERNATIVE EMBODIMENT

Figure 4:
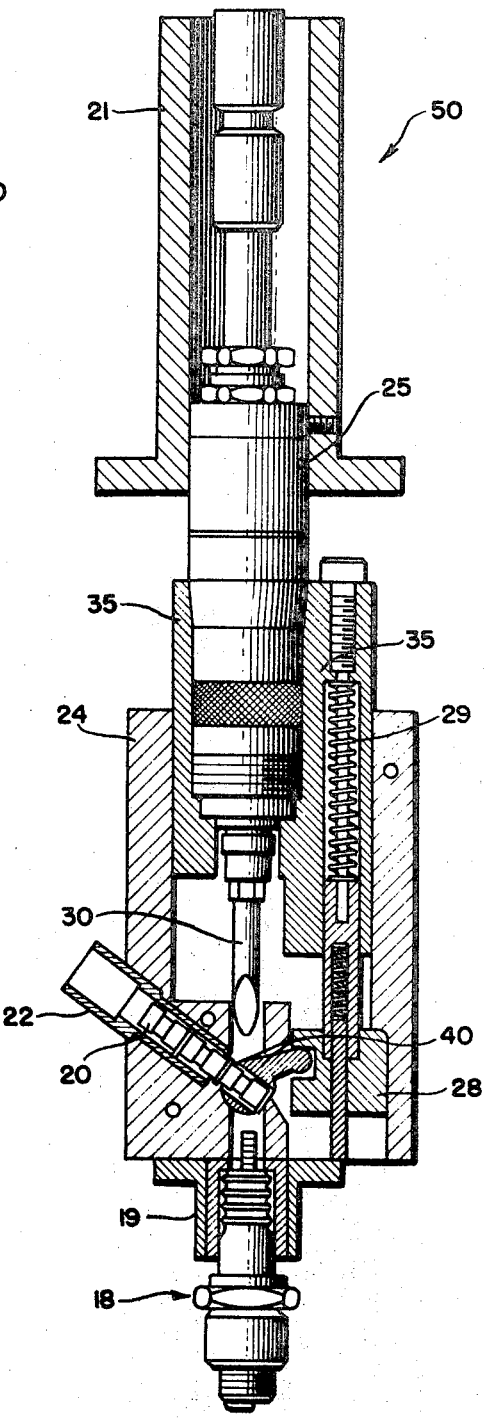
FIG. 4 shows an alternative embodiment of the illustrative nut runner utilizing a rotary rather than reciprocatory escapement, and illustrates the same in the position where the escapement is closed and the driver tool is not engaged.

The alternative embodiment nut runner 50 is illustrated and described in FIGS. 4 and 5. For convenience of understanding, and illustrative of the common principles employed in both, identical reference numerals are used for those parts which have a common functional relationship with the preferred embodiment illustrated and described above in connection specifically with FIGS. 2 and 3.

It will be noted in FIG. 4 that the same driver 25, an air-driven stall-type unit, is employed with an identical driver tool 30. The housing 24 has positioned interiorly thereof the actuator 35. A spring 29 is provided interiorly and in opposed relationship between the actuator 35 and the selector cam arm 28. The escapement 40 has an extending arm which is in cam engagement with the selector 28. In the alternative embodiment, the escapement is a rotary member having a bore therethrough to receive and pass the nut 20 when in the aligned position with the driver tool 30. As illustrated, a feed tube 22 is provided which is connected to the magazine 14, and a plurality of nuts 20 are fed in oriented linear fashion up to the escapement 40, and are blocked by the escapement 40 when the driver 25 is depressed and the driver tool 30 is about to engage the nut 20, but otherwise, as shown in FIG. 4, the escapement 40 presents its central bore to the feed tube 22 to receive the nuts 20.

When the nose 19 engages the work piece 18, and the handle 21 is pressed downwardly (as shown in FIG. 5) the selector cam arm 28 moves downwardly, and rotates the escapement 40 to present a through passageway for the working tool 30 to engage the nut 20 then in place. The driver 25 then moves further downwardly against the action of the spring 29 and completes threading the nut 20 onto the work piece 18. Thereafter the weight of the housing 24 and associated elements assisted by the spring 29 permit the actuator 35 to move upwardly with relation to the housing 24, and the selector cam arm 28 similarly moves upwardly and rotates the escapement 40 to receive another nut 20, ready for feeding and driving onto the work piece 18. The spring 29 in the instance of the rotary escapement feeder is confined linearly in a tube, whereas the spring 29 in the instance of the reciprocatory feeder wraps itself around the ends of spring pin 31 to huggingly engage the selector cam arm 28.

As shown in FIGS. 4 and 5, the feed tube 22 is at an angle of approximately 45° to the housing 24. This angle may vary between 45° and 30° such as shown in FIGS. 2 and 3 with the reciprocatory feeder. Alternatively, particularly with the reciprocatory feeder, and when a part is being fed in which the length is significantly less than the diameter such as a hexagonal nut, the feed may be at a 90° relationship to that of the axis of motion of the driver tool 30. The preferred embodiment with the reciprocatory escapement 40 will handle parts such as a hex but to greater advantage. A long part such as a pin, or a spark plug nut, is handled with facility with the alternative embodiment of FIGS. 4 and 5 since the length-to-diameter ratio is better than two to one. Additionally, while a magazine-type tubular feed 14 has been shown in connnection with both embodiments, where a hexagonal nut is involved, preferably a track-type feed is employed to avoid the kinking which may occur in a tubular magazine 14. Such tracks may be T-shaped in cross section, but ultimately will present the fastener member so that its through bore is parallel to that of the driver tool axis 30.

One of the principal advantages of both the preferred and alternative embodiments is the very small space occupied around the nose 19 of the nut runner 15. There is a minimum of diametrical spacing, as witness the bottom portions of FIGS. 2, 3, 4, and 5 laterally of the nose 19. This permits the work pieces 18, such as illustrated in FIG. 1, to be placed closely adjacent each other and yet each one be sequentially engaged and secured. Similarly in the positioning of pins, rivets, hexagonal nuts, and the like, on various manufactured devices, the nut runner 15, because of the narrow diameter of the nose 19, can move threaded or other fasteners into closely adjacent positions, feed the same, and drive the same automatically.

Although particular embodiments of the invention have been shown and described in full here, there is no intention to thereby limit the invention to the details of such embodiments. On the contrary, the intention is to cover all modifications, alternatives, embodiments, usages and equivalents of threaded fastener feed and drive mechanism as fall within the spirit and scope of the invention, specification and the appended claims.

What is claimed is:

1. A threaded fastener feed and drive mechanism comprising, in combination,
   feeding means for delivering oriented fastening elements,
   a drive member having fastener engaging means actuable by pressure on said fastener engaging means,
   a fastener positioning escapement actuator member secured to the drive member,
   a housing proportioned for longitudinal motion relative to the actuator member,
   a fastener escapement member shiftably positioned within the housing,
   a magazine portion in said feeding means in selective communication with said escapement,
   a selector operatively coupled to said housing and actuator,
   means for actuating the escapement by said selector in timed relationship to the longitudinal motion of the housing with respect to the actuator, whereby upon engaging a work piece and pressing thereagainst the drive member is positioned, run up, and the drive member removed by securing and removing the fastener from the piece.

2. In the threaded fastener feed and drive mechanism of claim 1,
   stop means on said housing for determining the actuating limits of movement of the escapement by the selector.

3. In the threaded fastener feed and drive mechanism of claim 1,
   a tooling adapter secured to the housing in longitudinal orientation with the fastener engaging means.

4. In the threaded fastener feed and drive mechanism of claim 1,
   said selector having pivotal means for actuating said escapement.

5. In the threaded fastener feed and drive mechanism of claim 1,
   yieldable means positioned to bias the sliding relationship between the drive member and the housing normally urging the fastener engagement means to its remote position from the escapement.

6. In the threaded fastener feed and drive mechanism of claim 1,
   said escapement having a nut receiving pocket.

7. In the threaded fastener feed and drive mechanism of claim 1,
   yieldable means normally urging said escapement and selector to the magazine communication position.

8. In the threaded fastener feed and drive mechanism of claim 1,
   said escapement being mounted in said housing for rotation of said nut receiving pocket.

9. In the threaded fastener feed and drive mechanism of claim 1,
   said escapement being a sliding block oriented for sliding in a plane perpendicular to the axis of the motion of the fastener engaging means.

10. In the threaded fastener feed and drive mechanism of claim 1,
    said selector being pivotably secured to said housing, and,
    cam means on said actuator and said selector coating to provide the timed relationship between the advancement of the drive means and the shifting of the escapement.

11. In the threaded fastener feed and drive mechanism of claim 9,
    said selector being pivotally secured to said housing, and,
    came means on said actuator and said selector coating to provide the timed relationship between the advancement of the drive means and the shifting of the escapement.

* * * * *